United States Patent [19]

Murphy et al.

[11] Patent Number: 5,694,193
[45] Date of Patent: *Dec. 2, 1997

[54] LOCKING PIVOTING LENS ASSEMBLY WITH HINGE DETENT

[75] Inventors: Peter J. Murphy, Port Washington; Richard E. Feinbloom, New York; Amy S. Grumet Avallone, Smithtown; Gordon R. Perry, New York, all of N.Y.

[73] Assignee: Designs for Vision, Inc., Ronkonkoma, N.Y.

[*] Notice: The term of this patent shall not extend beyond the expiration date of Pat. No. 5,652,636.

[21] Appl. No.: 599,796

[22] Filed: Feb. 12, 1996

[51] Int. Cl.⁶ ............... G02C 7/08; G02C 1/00; G02B 23/00
[52] U.S. Cl. ............... 351/58; 351/158; 359/399
[58] Field of Search ............... 351/58, 57, 59, 351/158; 359/399, 407, 409, 811, 812, 813

[56] References Cited

U.S. PATENT DOCUMENTS

| | | | |
|---|---|---|---|
| D. 296,337 | 6/1988 | Caplan | D16/133 |
| 2,422,661 | 6/1947 | Ellis | 351/57 |
| 2,459,021 | 1/1949 | Frommer | 351/57 |
| 3,990,788 | 11/1976 | Choy | 351/59 |
| 4,534,627 | 8/1985 | Vospero | 351/47 |
| 4,740,069 | 4/1988 | Baum | 351/57 |
| 4,929,075 | 5/1990 | Eliakim | 351/158 |
| 5,076,682 | 12/1991 | Pasfield | 351/158 |
| 5,381,263 | 1/1995 | Nowack et al. | 351/58 |

*Primary Examiner*—Huy Mai
*Attorney, Agent, or Firm*—Plevy & Associates

[57] ABSTRACT

An optical device comprising a spectacle frame having a pair of optical lenses. The optical device further includes a lens assembly pivotally attached to the spectacle frame which is pivotable between an operative position and a non-operative position. The optical device also includes an detent mechanism for repeatedly positioning the lens assembly into the operative position from the non-operative position. The lens assembly includes a support bracket for holding a pair of telescopes. The support bracket is contoured to the shape of the spectacle frame so that the bracket is substantially out of a user's forward line of sight when the lens assembly is in the operative position.

18 Claims, 4 Drawing Sheets

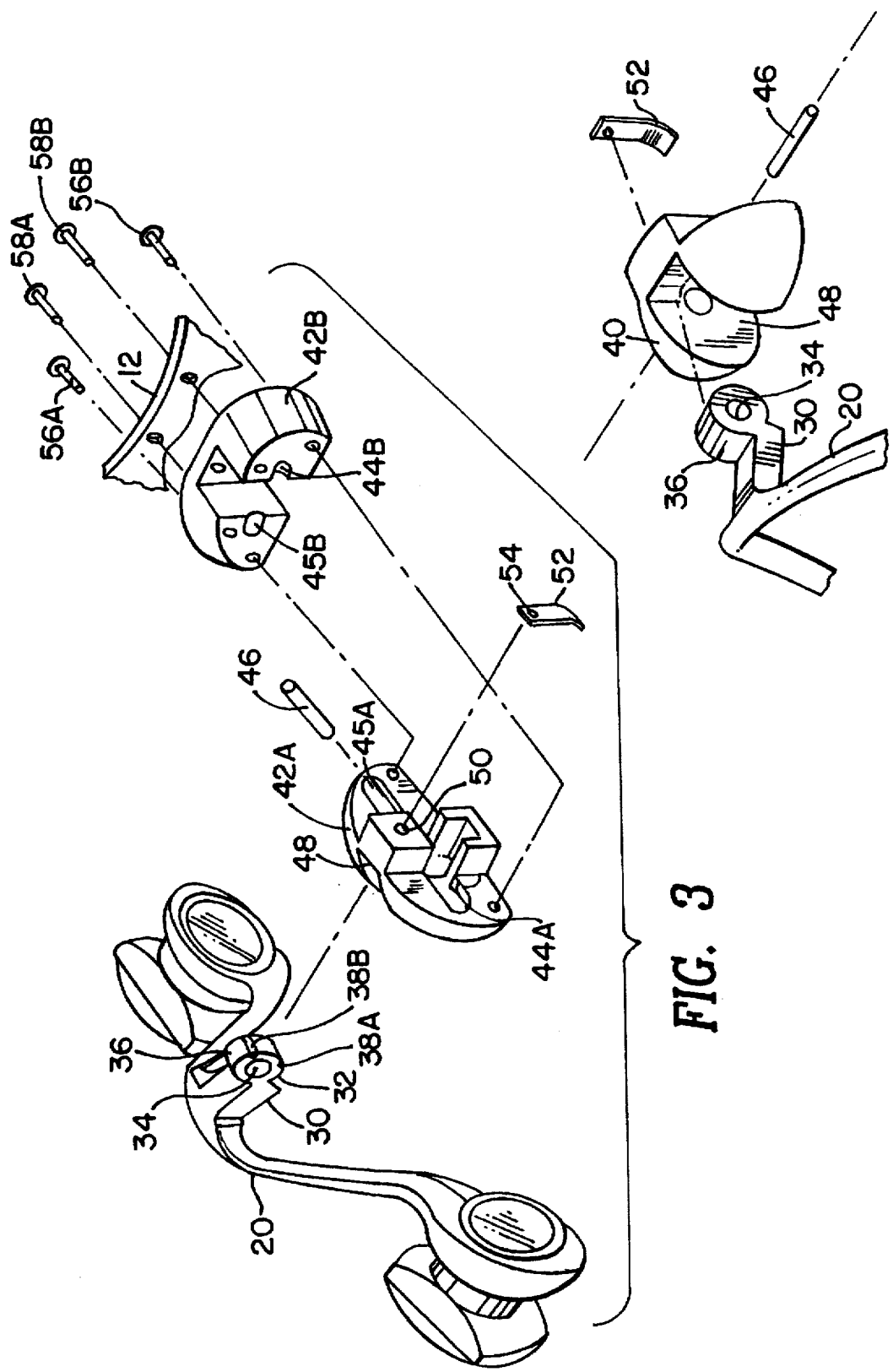

LOCKING PIVOTING LENS ASSEMBLY WITH HINGE DETENT

RELATED APPLICATIONS

The assignee herein, Designs for Vision, Inc., is the record owner of U.S. patent application Ser. No. 08/342,766 entitled LOCKING FLIP-UP TELESCOPIC LENS ASSEMBLY filed Nov. 21, 1994 by Richard Feinbloom, now abandoned and U.S. patent application Ser. No. 08/330,266 entitled BIOPTIC TELESCOPE SYSTEM FOR USE WITH BIFOCAL SPECTACLES filed Oct. 27, 1994 for Peter J. Murphy et al. now U.S. Pat. No. 5,541,767.

FIELD OF INVENTION

This invention relates generally to visual aids and more particularly to an optical spectacle device having a pivotally attached lens assembly which can be repeatedly and accurately located to a predetermined operative position without refocusing.

BACKGROUND OF THE INVENTION

The fields of dentistry, surgery, manufacturing and the like, involve precision work performed at an arms-length distance. Such precision work is much more desirably performed if the work area of interest can be significantly magnified as this reduces eye fatigue, improves working posture and increases the accuracy of the job. Moreover, there are people with serious vision deficiencies who must use specially designed vision aids attached to conventional spectacles in order to view objects that are either close-up or remotely located.

In response to the circumstances described above, a multitude of prior art magnification devices have been developed which provide magnification of distantly located objects. Many of these devices combine a conventional pair of spectacles with a pair of magnification lens or telescopes. One such type of device, attaches a telescope directly to each lens of the spectacles as shown in U.S. Pat. No. 4,929,075 entitled OPTICAL VIEWING SYSTEM issued to Eliakim on May 29, 1990.

Other prior art designs employ a telescope assembly which is pivotally attached directly to the spectacle frame of a convention pair of spectacles as disclosed in U.S. Design Pat. No. 296,337 entitled DENTAL BINOCULARS issued to Caplan on Jun. 21, 1988. In this patent, a pair of telescopes are mounted in bracket which is pivotally connected to a spectacle frame by a hinge arrangement. When a user wishes to view an object through both the spectacle lenses and the telescopes, the user flips the bracket holding the telescopes down to position the telescopes in front of the spectacle lenses. When the user wishes to view conventionally through the spectacles, the bracket holding the telescopes are flipped up so that the telescopes are out of the field of view of the spectacle lenses.

A problem associated with such pivoting telescope assemblies is that each of the telescopes must be refocused every time the bracket, which holds the telescopes, is flipped into the down position. This is because no mechanism is provided for accurately returning the bracket and thus, the telescopes, to the same position in front of spectacles lenses every time the bracket is flipped into the down position.

This can create a great inconvenience since the user must take his or her attention off the procedure being performed and refocus the telescopes or try to pivot the telescope assembly back into the same position as before. This is especially inconvenient, in procedures where the user is repeatedly flipping the telescope assembly up and down to look between the work area and the equipment and/or technicians.

It is, therefore, an object of the present invention to provide an improved flip-up lens assembly for a convention pair of spectacles, that can be repeatedly pivoted to the same operative position thereby substantially eliminating the need to refocus each of the lenses.

SUMMARY OF THE INVENTION

An optical device comprising a spectacle frame having a pair of optical lenses and a lens assembly attached to the spectacle frame. The lens assembly includes hinge means for allowing pivotal movement of the lens assembly between an operative position and a non-operative position relative to the spectacle frame. The hinge means including detent means for precisely positioning the lens assembly into the operative position from the non-operative position.

BRIEF DESCRIPTION OF THE DRAWINGS

The present invention will be better understood upon the reading the foregoing Detailed Description in conjunction with the drawings wherein:

FIG. 3 is a rear exploded view of the lens assembly;

FIG. 4 is a front exploded view of the hinge of the lens assembly shown in FIG. 3.

DETAILED DESCRIPTION OF THE INVENTION

Figure 1A:
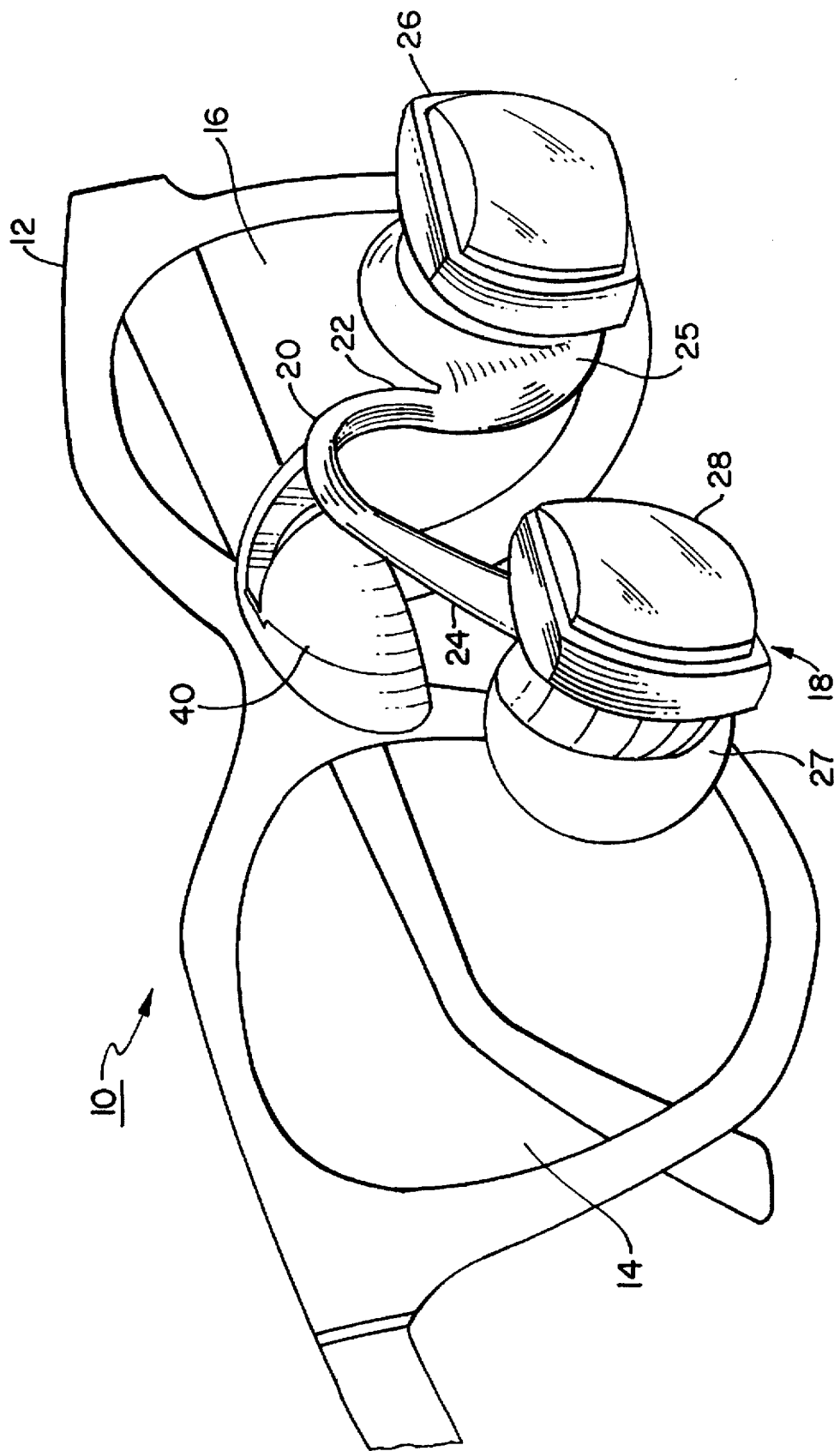
FIG. 1A is a front perspective view of an exemplary embodiment of the optical device of the present invention.

Referring to FIG. 1A, there is shown an exemplary preferred embodiment of the optical spectacle device according to the present invention designated by the numeral 10. The spectacle device 10 generally comprises a conventional spectacle frame 12 and a pivoting flip-up lens assembly 18 attached to the spectacle frame 12.

The spectacle frame 12 is conventionally made from plastic, metal or the like and includes a pair of glass or plastic optical lenses 14 and 16. The optical lenses 14 and 16 can include a user's vision corrections or be of the non-corrective type for user's with normal vision.

The flip-up lens assembly 18 includes a telescope support bracket 20 which is pivotally attached via a hinge arrangement (not visible) to a hinge housing 40. The support bracket 20 is an inverted U-shaped member having a first arm 24 which includes a first collar 27 and a second arm 22 which includes a second collar 25. The support bracket 20 can be made from any suitable material such as metal or plastic.

Figure 2:
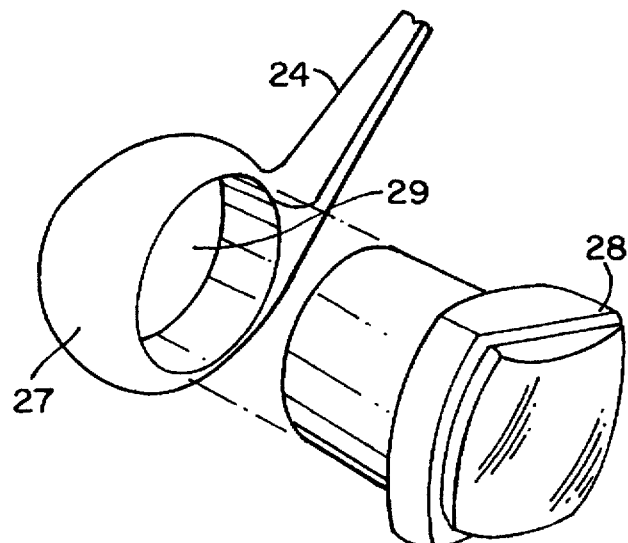
FIG. 2 is an enlarged exploded view of one of the telescopes and its associated support bracket arm.

Each of the collars 27 and 25 defines an aperture for receiving respective first and second telescopes 28 and 26. This is illustrated in FIG. 2 which depicts only the first collar 27 of the first arm 24 for the sake of simplicity (this description also applies to the second collar 25 as they are structurally identical). As can be seen, the first collar 27 defines an aperture 29 which receives the first telescope 28. Further, the first and second telescopes 28 and 26 are adhesively secured to their respective collars 27 and 25 using any suitable well known adhesive although, any other method for fastening the telescopes to the collars can be used. The telescopes 28 and 26 preferably employed in the present invention are well known Galilean telescopes.

Figure 1B:
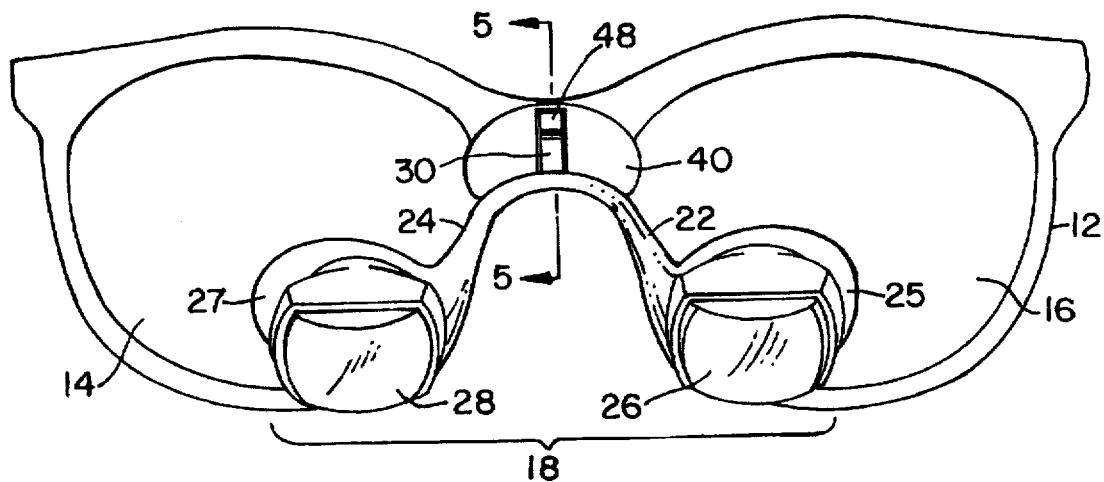
FIG. 1B is a front elevational view of the optical device of FIG. 1A.

Referring to FIG. 1B, the inverted U-shaped profile of the support bracket 20 is contoured to the shape of the spectacle frame 12 in order to minimize obstruction through the lenses 14, 16 when the flip-up lens assembly 18 is down in the operative position. The shape of the support bracket 20 also places the telescopes 28, 26 substantially in front of the lower portions of their respective lenses 14, 16 of the spectacle frame 12 when the flip-up telescopic lens assembly is down in the operative position. Further, the support bracket 20 angles the first and second telescopes 28, 26 in a downward direction. This can be seen in FIG. 5, which shows how the first arm 24 angles the first telescope 28 in the downward direction. This construction enables a user to easily look over the flip-up telescopes when the telescopes are flipped down in the operative position. Moreover, a user can merely look down through the lower portion of the spectacle frame lenses without head tilting or changing posture, when an object is viewed through the telescopes.

Referring to FIGS. 3 and 4, the support bracket 20 includes a bridge member 30 which obliquely extends from the intersection of the arms 22 and 24. The end of the bridge member 30 defines a hinge element 32 which forms a portion of the hinge arrangement. The hinge element 32 includes an aperture 34 and has a cylindrical outer surface 36. The hinge element 32 pivotally attaches the flip-up lens assembly 18 to the hinge housing 40 as will be described later below.

Referring still to FIG. 3, the hinge housing 40 is preferably manufactured as two keyed components: a front housing section 42A and a rear housing section 42B. This makes the hinge housing 40 is easy to manufacture and facilitates assembly of the support bracket 20 to the hinge housing 40. The individual components of the hinge housing 40 can be manufactured from any suitable material such as metal or plastic. A pair of screws 56A and 56B are used to retain the front and rear housing sections 42A and 42B together although any other like method can be used to retain the two housing sections together. A second pair of screws 58A and 58B attach the hinge housing 40 to the bridge of the spectacle frame 12.

A slot 48 extends into the front hinge housing section 42A and communicates with a first pair of hinge pin groove sections 44A and 44B and a second pair of hinge pin groove sections 45A and 45B which are defined in the mating surfaces of the front and rear hinge housing sections 42A and 42B. The hinge element 32 of the flip-up lens assembly 18 is disposed within the slot 48 (see also FIG. 4). A hinge pin 46, the ends of which are clamped between each pair of hinge pin grooves sections 44A, 44B, 45A, 45B, extends through the aperture 34 of the hinge element 32 to allow pivotal movement of the flip-up lens assembly 18 with respect to the hinge housing 40.

Figure 5:
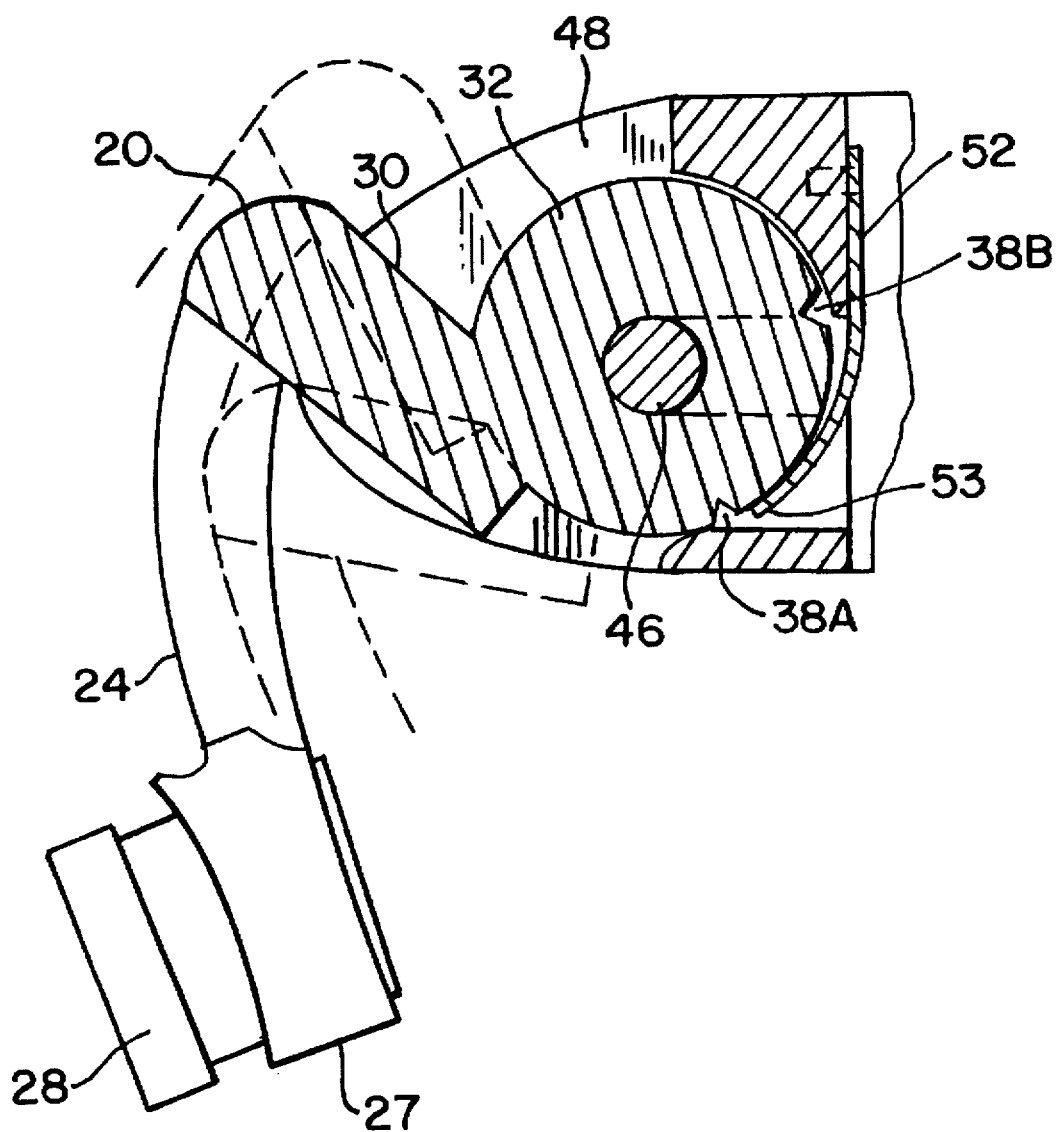
FIG. 5 is a partial cross-sectional side view of the hinge through line 5—5 of FIG. 1B.

As can be seen in FIGS. 4 and 5, the slot 48 enables the bridge member 30 of the support bracket 20 to transverse the front hinge housing section 42A when the lens assembly 18 is flipped up and down.

Referring again to FIGS. 3 and 4, a leaf-style spring element 52 is captured between the mating surfaces of the front and rear hinge housing sections 42A and 42B. The spring element is located by a dowel pin 50 which extends through an aperture 54 defined in the spring element 52. The spring element has a curved end portion 53 which rides along the cylindrical outer surface 36 of the hinge element 32 as the lens assembly 18 is pivoted up and down.

As best shown in FIG. 5, the cylindrical outer surface 36 of the hinge element 32 defines a first detent 38A and a second detent 38B which are spaced apart from each other. The detents cooperate with the end 53 of the spring element 52 to securely retain the lens assembly 18 in both the operative down position and the non-operative up position. More specifically, when the free end 53 of the spring element is in the second detent 38B, the lens assembly is in the non-operative up position. As pressure is applied to the lens assembly 18 to move it from the non-operative up position to the operative down position, the hinge element 32 rotates on the hinge pin 46 to force the free end 53 of the spring element out of the detent 38B. Continued rotation of the hinge element relative to the spring element 52 as the lens assembly is pivoted down, causes the free end 53 of the spring element 52 to ride along the cylindrical outer surface of the hinge element 32 until the free end 53 enters the first detent 38A. When the free end 53 is in the first detent 38A, the lens assembly 18 is in the operative down position. The free end 53 of the spring element 52 is always biased against the hinge element so that when the free end 53 enters one of the detents 38A, 38B, the flip-up lens assembly 18 is precisely located and retained in either the operative or non-operative position. The hinge element 32 is maintained in a one of the two positions until a substantial rotational torque is applied to the flip-up lens assembly 18 to move the free end 53 out of the detent.

As should now be apparent, the problems associated with prior art pivoting telescope assemblies is substantially overcome in the present invention. In particular, the spring/detent arrangement of the present invention accurately returns the flip-up lens assembly, to the same position in front of spectacles lenses every time the support bracket is flipped into the operative down position. Thus, the telescopes don't require refocusing. The present invention is especially beneficial in for users performing procedures where the user must repeatedly flip the telescope assembly up and down to look between the work area and the equipment and/or technicians.

It should be understood that the embodiment described herein is merely exemplary and that a person skilled in the art may make many variations and modifications to the embodiment utilizing functionally equivalent elements to those described herein. Any and all such variations or modifications as well as others which may become apparent to those skilled in the art, are intended to be included within the scope of the invention as defined by the appended claims.

What is claimed is:

1. An optical device comprising:
   a spectacle frame having a pair of optical lenses; and
   a lens assembly attached to said spectacle frame, said lens assembly including hinge means for allowing pivotal movement of said lens assembly between an operative position and a non-operative position relative to said spectacle frame, said hinge means including detent means for precisely positioning said lens assembly into said operative position from said non-operative position, wherein said detent means includes a detent and spring means which cooperates with said detent, for locking said lens assembly in said operative position.

2. The optical device of claim 1, wherein said lens assembly includes support means for holding a telescope.

3. The optical device of claim 2, wherein said support means is substantially out of a user's forward line of sight when said lens assembly is in said operative position.

4. The optical device of claim 1, wherein said lens assembly includes a telescope.

5. The optical device of claim 1, wherein said lens assembly includes two telescopes.

6. The optical device of claim 1, wherein at least one of said pair of optical lenses comprises a corrective optical lens.

7. The optical device of claim 1, wherein said detent means includes a second detent for biasing said hinge means and locking said lens assembly in said non-operative position.

8. The optical device of claim 1, wherein said spring means includes a leaf spring.

9. An optical device comprising:

a spectacle frame having a pair of optical lenses; and a lens assembly attached to said spectacle frame, said lens assembly including:

an inverted U-shaped support bracket having first and second arms;

a housing attached to said spectacle frame; and hinge means associated with said housing and said support bracket, for allowing pivotal movement of said lens assembly between an operative position and a non-operative position relative to said spectacle frame, said hinge means including detent means for precisely positioning said lens assembly into said operative position from said non-operative position, wherein said detent means includes a detent and spring means which cooperates with said detent, for locking said lens assembly in said operative position.

10. The optical device of claim 9, wherein said arms of support bracket are contoured to the shape of said spectacle frame so that said support bracket is substantially out of a user's forward line of sight when said lens assembly is in said operative position.

11. The optical device of claim 9, wherein said lens assembly includes two telescopes.

12. The optical device of claim 9, wherein said detent means includes a second detent for locking said lens assembly in said non-operative position.

13. The optical device of claim 9, wherein said spring means includes a leaf spring.

14. An optical device comprising:

a spectacle frame having a pair of optical lenses; and a lens assembly attached to said spectacle frame, said lens assembly including:

an inverted U-shaped support bracket having a first arm, a second arm, and a hinge element with a cylindrical outer surface;

a housing attached to said spectacle frame; and hinge pin retained within said housing and extending through said hinge element of said support bracket, for allowing pivotal movement of said lens assembly between an operative position and a non-operative position relative to said spectacle frame, said hinge element including spring biased detent means for precisely positioning said lens assembly into said operative position from said non-operative position.

15. The optical device of claim 14, wherein said, arms of support bracket are contoured to the shape of said spectacle frame so that said support bracket is substantially out of a user's forward line of sight when said lens assembly is in said operative position.

16. The optical device of claim 14, wherein said lens assembly includes two Galilean telescopes.

17. The optical device of claim 14, wherein said detent means include first and second detents and a leaf spring element that cooperates with one of said first and second detents to lock said lens assembly in said operative and non-operative positions.

18. The optical device of claim 17, wherein said spring element includes a curved end portion that engages one of said first and second detents.

* * * * *